Figure 1:
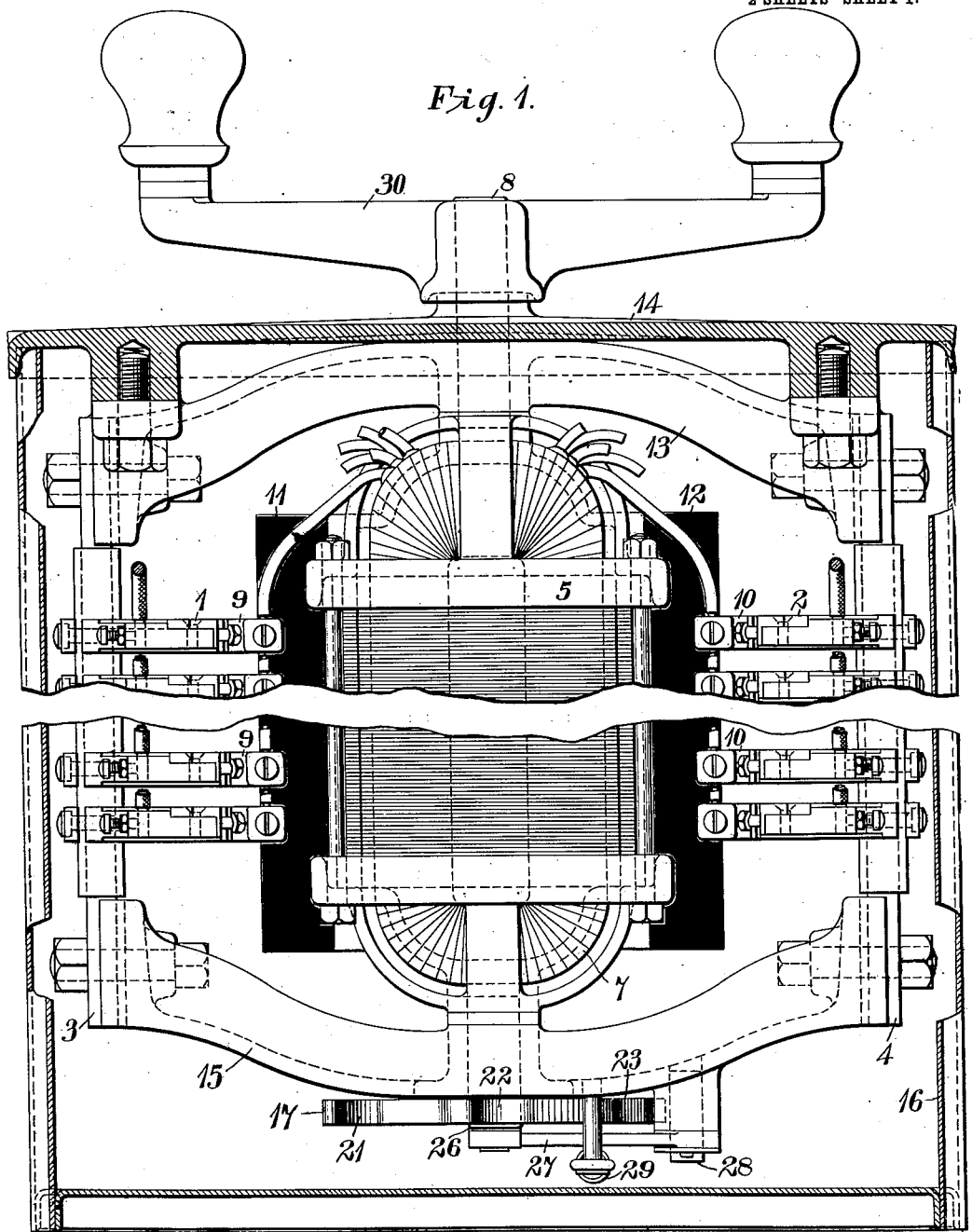

No. 846,626. PATENTED MAR. 12, 1907.
F. SCHAEFER.
CONTROLLER FOR ELECTRIC MOTORS.
APPLICATION FILED FEB. 20, 1906.

2 SHEETS—SHEET 1.

WITNESSES:
Fred H. Miller
R. J. Dearborn

INVENTOR
Frederic Schaefer
BY
ATTORNEY

No. 846,626. PATENTED MAR. 12, 1907.
F. SCHAEFER.
CONTROLLER FOR ELECTRIC MOTORS.
APPLICATION FILED FEB. 20, 1906.

2 SHEETS—SHEET 2.

WITNESSES:
Fred H. Miller
R. J. Dearborn

INVENTOR
Frederic Schaefer
BY
Wesley S. Carr
ATTORNEY

UNITED STATES PATENT OFFICE.

FREDERIC SCHAEFER, OF WILKINSBURG, PENNSYLVANIA.

CONTROLLER FOR ELECTRIC MOTORS.

No. 846,626.

Specification of Letters Patent.

Patented March 12, 1907.

Application filed February 20, 1906. Serial No. 302,101.

*To all whom it may concern:*

Be it known that I, FREDERIC SCHAEFER, a citizen of the United States, and a resident of Wilkinsburg, in the county of Allegheny and State of Pennsylvania, have invented a new and useful Improvement in Controllers for Electric Motors, of which the following is a specification.

My invention relates to controllers for electric motors, and has special reference to such devices as are adapted to regulate the electromotive force and circuit connections for starting and operating alternating-current electric motors.

The object of my invention is to provide a controller of the type above indicated that shall be simple, durable, and compact in construction and in which the number of contact members and the length of the transformer-leads required for a given number of voltage variations may be reduced to a minimum.

Controllers for use with alternating-current motors of moderate size have usually comprised one or more single-winding transformers having a common core member and a suitable switching device, such as a contact-carrying drum and engaging fingers therefor, which effected the proper circuit connections. In a common form of such controllers the drum is rotatably mounted in a horizontal plane, and it and the starting contact-fingers which it engages are oil-immersed, the fingers being connected to the supply-line and the motor-circuits and the taps of the transformers, which are stationary, being located above the oil-level and the finger-base. The number of control-fingers is necessarily large with this arrangement, and the length of the transformer-leads is considerable.

According to my present invention contact-fingers are mounted on suitable insulating members and are stationary with respect to the transformers, which are rotatably mounted and may be oil-immersed. The contact-fingers are adapted to engage stationary contact members, which comprise segments of concave cylindrical surfaces and may also be oil-immersed. With this arrangement the supply-line conductors and the motor-leads are connected directly to the stationary contact members, while the transformer-taps are connected directly to the contact-fingers which are relatively stationary. Since the motor and the supply-line are connected to stationary contact members and the transformer-leads are connected to contact members which are relatively stationary, it is evident that the length of the connecting-leads and also the number of contact members may be reduced to a minimum, and inasmuch as the transformer is rotatably mounted in oil it may be reduced in size and weight. The contact-fingers which are attached to the transformer may preferably be divided into two or more similar groups disposed in lines which are parallel to the axis of rotation of the transformer, so that the controller may pass through a complete cycle in one direction, while the rotating member describes an arc of one hundred and eighty degrees or less.

My invention is illustrated in the accompanying drawings, in which—

Figure 2:
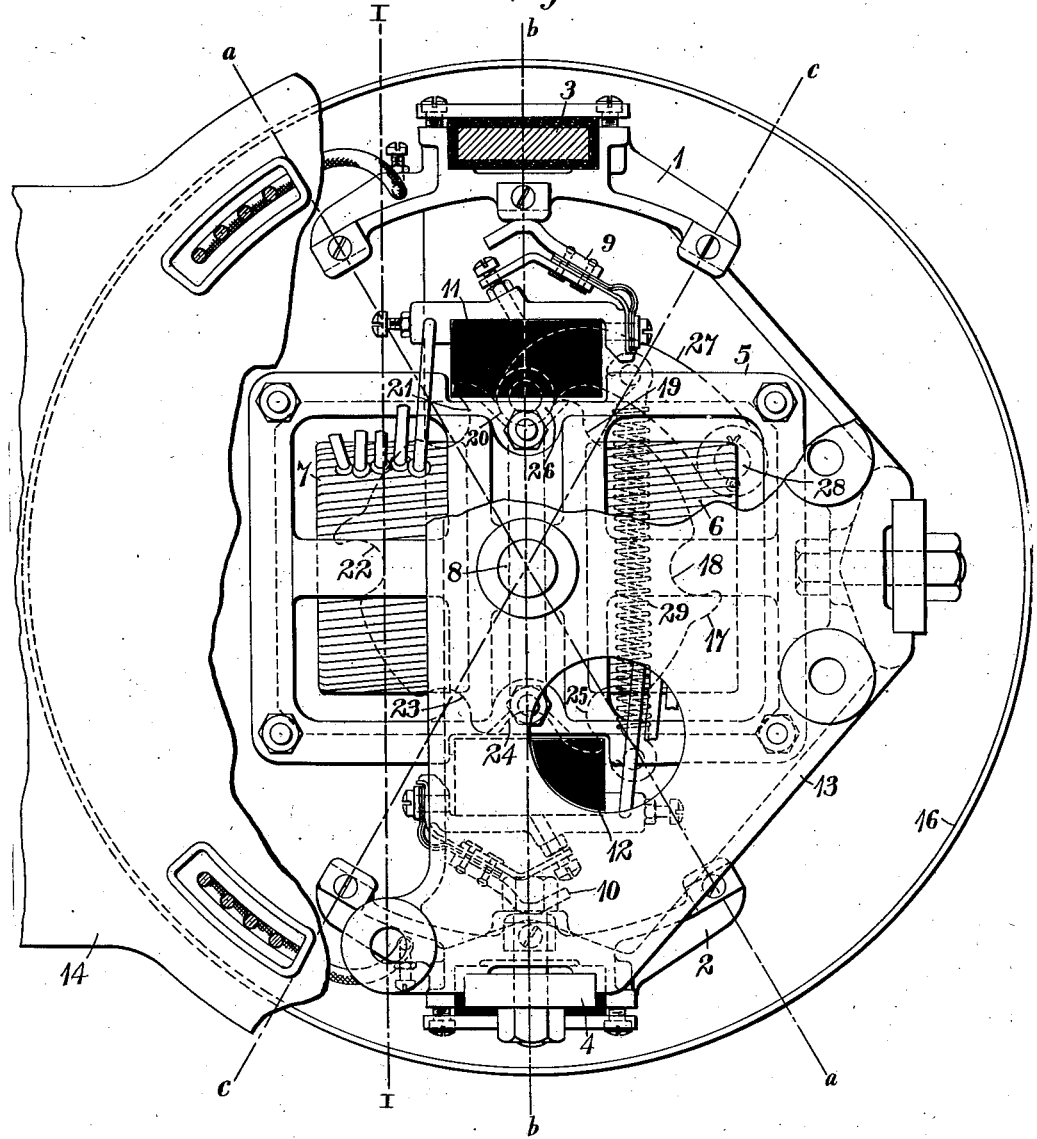
Figure 3:
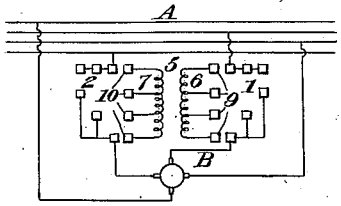

Figure 1 is a view, mainly in elevation, but partly in section, on a line I I of Fig. 2, which is a plan view of the controller shown in Fig. 1. Fig. 3 is a diagram of circuits, illustrating the use of my invention.

Referring to the drawings, the controller illustrated therein comprises two groups 1 and 2 of stationary contact members, that are mounted upon insulated rods 3 and 4, a transformer 5, provided with coils 6 and 7 and mounted upon a shaft 8, which is rotatably mounted in suitable bearings, two groups of contact-fingers 9 and 10, mounted upon insulating-strips 11 and 12, with which the transformer is provided. The fingers 9 and 10 are adapted, respectively, to engage the groups 1 and 2 of the stationary contact members as the transformer is rotated. The rods 3 and 4 and an upper bearing-spider 13 are attached to a top casting 14, and a lower bearing-spider 15 is attached to the lower extremities of the rods, thereby forming a supporting-frame for the movable parts. As the controller parts are suspended from the top casting or upper part of the frame, a tank 16, containing oil or other insulating fluid, may surround the transformer and the switch parts and be made separately detachable.

The two groups of contact-fingers 9 and 10 are adapted to suitably engage corresponding stationary contact members when the controller occupies any one of the positions *a, b,* and *c* to which it is adapted.

The two groups of stationary contact members are alike, and the groups of movable contact members are also alike and are located on diametrically opposite sides of the transformer. One stationary group is adapted to be connected to one phase of the supply-line A and the motor B, and the other stationary group is adapted to be connected to another phase of the supply-line and the motor, so that by rotating the transformer, together with the movable contact-fingers, through an arc less than one-half of a revolution the controller passes from its "off" position to its running position, and it is only necessary to move the controller through an arc of one hundred and eighty degrees in order to complete its cycle from off position to off position, since the transformer-windings are connected to the line conductors and to the motor through the movable contact-fingers and since it is immaterial to which phase of the circuit a transformer-winding is connected.

The several control positions are accentuated by means of a plurality of notches 18, 19, 20, 21, 22, 23, 24, and 25 in the periphery of a cam 17, which is fixed to the shaft 8. These notches are engaged by a pawl 26, that is pivotally mounted at one extremity of a lever 27, the latter being fulcrumed near its opposite extremity upon a shaft 28 and the pawl being held in engagement with the periphery of the cam by a spring 29. The notches 18 and 22, which are diametrically opposite each other, correspond to the off positions of the controller and are of such form as to limit the movement of the cam to one direction of rotation. Assuming that the pawl 26 is in engagement with the notch 18 of the cam when the movable contact-fingers 9 and 10 are disengaged from the stationary contact members entirely, it is then possible to rotate the shaft 8 by means of a double operating-handle 30, together with the transformer 5 and the cam 17, until the pawl 26 engages the notch 19. From this notch, which corresponds to the control position $a$, it is possible to either return the controller to the off position corresponding to notch 18 or to move it to the next starting position, in which the pawl 26 engages the notch 20 and the movable contact-fingers engage the stationary contact members in the control position $b$. A further rotation of the transformer in the same direction brings the pawl 26 into engagement with the notch 21, the form of which is similar to that of the notch 18 and corresponds to the controller running position $c$ and prevents the return of the controller through positions 20 and 19 to the off position indicated by notch 18. The movable part, however, is free to rotate in the opposite direction, the pawl 26 moving into engagement with the notch 22, which also indicates an open-circuit position for the controller. In a similar manner the controller may occupy successively positions $a$, $b$, and $c$, which are now accentuated by the engagement of the pawl 26 with notches 23, 24, and 25, from which notches it may only pass to the off position accentuated by notch 18 when the revolution is complete. Thus it will be observed that the controller may be moved from either of its off positions through two starting positions to a running position and from the running position directly to the off position, but may not be moved from either one of the off positions directly to a running position or from either running position to either of the starting positions. Thus the action of the controller permits of the use of separate protective means for the starting and for running positions, so that a relatively heavy electric current may be admitted to the motor during the starting period without interrupting the circuit.

The advantages of the separate protection for the starting and the running positions of a controller are set forth in Patent No. 807,938, granted to the Westinghouse Electric & Manufacturing Company as assignee of Henry D. James.

The rotation of the movable member may of course be confined to a limited arc of rotation corresponding to a well-known form of drum-controller in which the contact-fingers reëngage the ring-segments in the accelerating positions as the controller is moved from the running to the off position.

Although I have shown the transformer as rotatably mounted, substantially the same results may be obtained by rotating the contact members which are shown as stationary or by moving either or both of the members otherwise than rotatably, since any relative motion of the desired degree between the two parts will effect the desired result in a more or less satisfactory manner, and I desire that variations which do not depart from the spirit of my invention shall be included within its scope.

I claim as my invention—

1. A controller for electric motors that comprises a transformer and two sets of relatively movable engaging contact members one of which is mounted upon the transformer core or frame.

2. A controller for electric motors that comprises a rotatably-mounted transformer having a winding which is provided with a plurality of taps, a set of contact-fingers connected thereto and attached to but insulated from the transformer and a corresponding set of stationary contact parts which are engaged by the fingers on the rotatable member.

3. A controller for alternating-current electric motors that comprises a transformer which is movably supported, a series of contact-fingers that are fixed relative thereto, a plurality of intermediate taps in the winding of said transformer which are connected to said contact-fingers, and a plurality of stationary contact members which are engaged by said fingers.

4. In a circuit-controller, the combination with a plurality of stationary contact members that are connected to electric supply and motor circuits, of a movably-mounted transformer and a plurality of contact-fingers which are fixed relative thereto and are connected to taps in the transformer-winding.

5. In a controller, the combination with a movably-mounted transformer-core, two similar windings therefor, a pair of strips of insulating material attached thereto, two groups of contact-fingers which are mounted on said strips and are connected to said windings, of similar stationary groups of contact members which may be engaged by said transformer-fingers.

6. In a controller for electric motors, the combination with a rotatably-mounted transformer, an operating-handle therefor, contact-fingers connected to the windings of said transformer and fixed relative thereto, and stationary contact members which are adapted to be engaged by the transformer-fingers, of means for accentuating a plurality of controller positions comprising a notched cam that is fixed relative to the transformer and an engaging pawl therefor.

7. In a controller for polyphase electric motors, the combination with a rotatably-mounted transformer-core, a plurality of windings therefor, groups of contact-fingers connected to said winding and fixed relative to said core, of stationary contact members which are adapted to be simultaneously engaged by said groups of transformer-fingers and are connected to the electric motor and supply circuits.

8. In a controller for a multiphase electric motor, the combination with a rotatably-mounted transformer-core, a pair of similar windings therefor, two groups of contact-fingers which are respectively connected to said windings and are fixed upon diametrically opposite sides of the core, and means for operating said rotatable parts, of two similar groups of stationary contact members that are adapted to be simultaneously engaged by the movable contact-fingers.

9. In a controller for a multiphase electric motor, the combination with a rotatably-mounted transformer-core, a pair of similar windings therefor, two groups of contact-fingers which are respectively connected to said windings and are fixed upon diametrically opposite sides of the core, and means for operating said rotatable parts, of two similar groups of stationary contact members that are adapted to be simultaneously engaged by the movable contact-fingers and are respectively connected to different phases of the motor and supply circuits.

10. In a controller for a two-phase electric motor, the combination with a rotatably-mounted transformer-core, a pair of similar windings therefor, two groups of contact-fingers which are respectively connected to said windings and are fixed upon diametrically opposite sides of the core, and means for operating said rotatable parts, of two similar groups of stationary contact members that are adapted to be simultaneously engaged by the movable contact-fingers, and means for accentuating the several positions of engagement between the stationary and movable contact members.

11. In a controller for a two-phase electric motor, the combination with a rotatably-mounted transformer-core, a pair of similar windings therefor, two groups of contact-fingers which are respectively connected to said windings and are fixed upon diametrically opposite sides of the core, and means for operating said rotatable parts, of two similar groups of stationary contact members that are adapted to be simultaneously engaged by the movable contact-fingers, and means for accentuating the several positions of engagement between the stationary and movable contact members comprising a notched cam which is fixed to the rotatable members and an engaging pawl therefor.

12. In a controller for electric motors, the combination with a rotatably-mounted transformer having a winding which is provided with a plurality of taps, a series of contact-fingers that are connected thereto and are fixed to and insulated from the transformer, and a corresponding series of stationary contact parts which are engaged by the fingers on the rotatable member, of an interlocking device that permits movement of said rotatable transformer progressively in only one direction from the "off" position and from the running position.

13. In a controller for electric circuits, the combination with a plurality of stationary contact members that are connected to electric and motor circuits, a rotatably-mounted transformer and a plurality of contact-fingers which are fixed relative thereto and are adapted to engage said stationary contact members and are also connected taps into the transformer-winding, of an interlocking device that permits progressive rotation of said transformer member in one direction and prevents rotation in the opposite direction when said member occupies one or more predetermined positions.

14. In a controller for electric motors, the combination with a rotatably-mounted transformer, an operating-handle therefor, contact-fingers connected to the windings of said transformer, and fixed relative thereto, stationary contact members which are adapted to be engaged by the transformer-fingers, of means for accentuating the plurality of controller positions which permit progressive rotation of said transformer member in one direction and prevent rotation in the opposite direction when said transformer occupies one or more predetermined positions and which comprise a notched cam that is fixed relative to the transformer and an engaging pawl therefor.

15. In a controller for a polyphase electric motor, the combination with a rotatably-mounted transformer-core, a pair of similar windings therefor, two groups of contact-fingers which are respectively connected to said windings and are fixed upon diametrically opposite sides of the core, means for operating said rotatable parts, two similar groups of stationary contact members that are adapted to be simultaneously engaged by the movable contact-fingers, of means for indicating the controller positions which permit progressive rotation of said transformer member in one direction and prevent rotation in the opposite direction when said transformer occupies one or more predetermined positions and which comprise a notched cam that is fixed relative to the transformer and an engaging pawl therefor.

16. In a controller, the combination with a member comprising a transformer and a set of contact-terminals mounted thereon, of a member having a second set of contact-terminals to coöperate with the first set and means for moving one of said members relatively to the other.

In testimony whereof I have hereunto subscribed my name this 16th day of February, 1906.

FREDERIC SCHAEFER.

Witnesses:
R. J. DEARBORN,
BIRNEY HINES.